United States Patent [19]
Heidel

[11] Patent Number: 5,524,888
[45] Date of Patent: Jun. 11, 1996

[54] GAMING MACHINE HAVING ELECTRONIC CIRCUIT FOR GENERATING GAME RESULTS WITH NON-UNIFORM PROBABILITIES

[75] Inventor: Raymond Heidel, Henderson, Nev.

[73] Assignee: Bally Gaming International, Inc., Las Vegas, Nev.

[21] Appl. No.: 234,141

[22] Filed: Apr. 28, 1994

[51] Int. Cl.$^6$ ............................................. G07F 17/34
[52] U.S. Cl. ................................................ 463/22; 463/21
[58] Field of Search .............................. 273/143 R, 138 A

[56] References Cited

U.S. PATENT DOCUMENTS

| | | | |
|---|---|---|---|
| 3,580,581 | 5/1971 | Raven | 273/138 A |
| 4,448,419 | 5/1984 | Telnaes | 273/143 R |
| 4,858,932 | 8/1989 | Keane | 273/143 R |
| 5,219,167 | 6/1993 | Hamano | 273/143 R |

*Primary Examiner*—Jessica J. Harrison
*Attorney, Agent, or Firm*—Jenner & Block

[57] ABSTRACT

A gaming machine uses a time-based method for generating game results having nonuniform probability. The gaming machine employs an addressable memory in cooperation with a counter and a clock. The clock generates a very fast series of pulses, and includes a digital-to-analog converter. The counter holds a number representing one of the possible reel stop positions and counts the clock's pulses, so that with each pulse, the value of the counter advances by one. To vary the odds that a particular reel stop position will be selected, the clock's pulses do not come at even intervals. Rather, the clock is responsive to a digital input signal to control how long it will allow a particular number to remain in the counter before the next clock pulse. The binary numbers which are used to control the clock are stored in memory. The memory accepts as input the current value of the counter. Thus, when the counter is incremented, the memory provides the binary number associated with the new counter value. By selecting appropriate binary numbers for each possible counter value, the relative amounts of time which the counter holds each value (and, therefore, the probability of selection) can be varied.

3 Claims, 4 Drawing Sheets

GAMING MACHINE HAVING ELECTRONIC CIRCUIT FOR GENERATING GAME RESULTS WITH NON-UNIFORM PROBABILITIES

FIELD OF THE INVENTION

The invention relates to gaming machines generally, and in particular to circuits for determining game results having a nonuniform probability distribution.

BACKGROUND OF THE INVENTION

Gaming machines include games of chance such as slot machines. The traditional mechanical slot machine includes three or four symbol bearing reels, which are rotatably mounted on a common axis. The symbols are located on the peripheries of the reels, and are typically pictures of bells, bars, and fruit. There are also "blank" symbols, which are the portions of the reels' peripheries in between the picture symbols. A line (the "win line") is placed adjacent to the reels, so that when the reels are at rest, at least one symbol from each reel is visually associated with the win line.

To play the slot machine, the player spins the reels by pulling a lever which is mechanically linked to the reels. After a brief period of spinning, the reels come to rest, each reel displaying a symbol or blank space along the win line. The displayed combination of symbols is a random game result, and corresponds to a predetermined payout, which may be zero. The payout for a particular game result usually depends on the probability of that game result occurring.

Each reel's final resting position will be one of a predetermined and discreet "reel stop positions." At each reel stop position, a particular part of the reel's periphery (either a symbol or a blank space) is displayed at the win line. Thus, each reel stop is associated with a particular symbol or blank. In a mechanical slot machine, the probability of a particular symbol being displayed at the win line is $N_S$ divided by $N_R$, where $N_R$ is the total number of reel stop positions, and $N_S$ is the number of reel stop positions associated with the particular symbol. Where a symbol is associated with only a single reel stop position, its probability of being displayed is one in $N_R$. Thus, the range or "spectrum" of probabilities which can be developed in a mechanical slot machine is 1:1 through 1:$N_R$.

In the 1970's, manufacturers developed electronic versions of the traditional mechanical slot machine. In these electronic machines, the reels are computer controlled, and there is no mechanical linkage between the lever and the reels. Instead, when the user pulls the lever, the computer randomly selects reel stop positions for each of the reels, and then sets the reels into motion with a motor. The reels are allowed to spin for a short time, and then are stopped at the selected reel stop positions.

In effect, the game result is determined by the computer, with the spinning reels used only to display that result. Thus, in some machines, the reels are eliminated altogether, and the game result displayed on a video screen. The video display is often a representation of spinning reels, to preserve the charm and excitement of the traditional slot machine.

In determining a game result, the computer simulates the mechanical slot machines by randomly picking reel stop positions for each reel. A table in the computer's memory indicates which symbol (or blank space) is associated with each reel stop position, so the computer can determine the game outcome (that is, the ultimate combination of selected symbols).

In a mechanical reel slot machine, the spinning reel is equally likely to come to rest at one reel stop position as another. Thus, each reel stop position has an equal chance of being "selected." This is referred to as a "uniform probability distribution." For example, in a three-reel uniform probability machine with thirty-two reel stop positions, the lowest possible probability for a particular game outcome is one chance in $32^3$ (or 1:32,768). Assuming each play costs one dollar, the payout for this particular game outcome cannot exceed $32,768, without the game losing money over time to the players.

In an electronic slot machine, the computer can also pick reel stop positions in accordance with a uniform probability distribution. Alternatively, the computer can assign different probabilities to different reel stop positions. This is referred to as "nonuniform probability distribution." The advantage to nonuniform distributions is that they allow the spectrum of game result probabilities to be greatly expanded. Thus, in a nonuniform probability system, certain game outcomes can be assigned low probabilities, such as, for example, one in one million. The corresponding payout can be increased without making the machine unprofitable—in this example, the payout could be one million dollars (assuming a one dollar bet). These high payouts, although extremely rare, are attractive to many players, and therefore are a desirable feature to have on a gaming machine.

One way in which expanded probability spectrums have been implemented in slot machines is by using a "virtual" reel. A virtual reel is a model of a physical reel which exists only in the computer's memory. The virtual reel can have a large number of reel stop positions—far more than a physical reel. Each reel stop position in the virtual reel is associated with a particular symbol. Symbols corresponding to higher payouts are associated with only a few (or even one) virtual reel stop position. Thus, the probability of a game outcome including such symbols is greatly reduced. Because the virtual reel has more reel stop positions than a physical reel, its probability spectrum is increased.

Another technique for expanding the probability spectrum in gaming machines is the "time based" method. In the time based method, game outcomes are represented by the contents of a digital counter or other suitable state machine. The counter has a range of zero to seven, for example, and each of its eight possible values corresponds to a game event. The counter rapidly and repetitively cycles through its range. At an arbitrary point in time, a player presses a button and interrupts the counter, leaving it suspended on a particular number. This number is random in the sense that it can not be predicted by the player, and the event corresponding to this number is selected as the game outcome.

It has been recognized that the odds of selecting a particular number (that is, game outcome) can be varied by adjusting the relative amount of time that the counter holds each number. Thus, if the counter holds one number longer than the other, it is more likely to be holding that number when it is interrupted by the player. Likewise, if the counter spends less time holding a particular number, then it is less likely that the counter will be holding that number when it is interrupted by the player.

To vary the time which the counter spends at each number, the counter is driven by a variable frequency astable multivibrator. Each cycle of the multivibrator generates a pulse, which increments the counter. The duration of the period between pulses is controlled by a series of RC networks, each having a different resistance value. The networks are successively electronically coupled to the multivibrator each time the counter is incremented. Thus, the intervals between pulses (and, consequently, the amount of time the counter spends at each number) vary in accordance with the value of the resistor in the particular RC network which is coupled to the multivibrator.

SUMMARY OF THE INVENTION

Although the time-based method has been available since at least 1971, it has not gained widespread acceptance as a technique for generating nonuniform probability distributions in gaming machines. The primary drawback of the existing systems is their reliance on fixed circuitry (namely, the RC networks). This makes the systems inflexible and difficult to construct. Once built, the probability distribution cannot be altered except by removing and replacing the resistors forming the RC networks. Additionally, the existing systems rely on resistor networks, and therefore require resistors that have been carefully calibrated.

Accordingly, the present invention is a gaming machine that uses a time-based method for generating game results having nonuniform probability, but is easy to construct, flexible in application, and readily updated once the machine is in use.

The gaming machine of the present invention employs an addressable memory in cooperation with a counter and a clock. The clock generates a very fast (or "high frequency") series of pulses. This series is referred to as a "timing signal." The duration of time (or "period") between these pulses is quite small—on the order of 10 microseconds. The counter holds a number representing one of the possible reel stop positions. For example, the number may range from zero to thirty-one. The counter counts the clock's pulses, so that with each pulse, the value of the counter advances by one. When the counter reaches its upper limit, it starts counting from zero again.

To vary the odds that a particular reel stop position will be selected, the clock's pulses do not come at even intervals. Rather, the periods between pulses vary so that the counter holds some numbers longer than others. The clock is responsive to a digital input signal (that is, a binary number) to control how long it will allow a particular number to remain in the counter before the next clock pulse.

The binary numbers which are used to control the clock are stored in memory, where they are associated with particular counter values. The memory accepts as input the current value of the counter. Thus, when the counter is incremented, the memory provides the binary number associated with the new counter value. By selecting appropriate binary numbers for each possible counter value, the relative amounts of time which the counter holds each value (and, therefore, the probability of selection) can be varied. Because memory can be conveniently programmed, the binary numbers can be readily set or changed, depending on the desired probability distribution.

In one embodiment, the clock is an astable multivibrator in combination with an digital-to-analog converter ("DAC"). The astable multivibrator generates a pulse train, the frequency of which is controlled by the analog output of the DAC. The DAC, in turn, is controlled by the preselected numbers contained in the memory. Thus, each counter value causes the memory to provide one of the preselected binary numbers to the DAC, which then controls the frequency of the astable multivibrator.

While ideally suited for use in slot machines, the present invention can be used in any game of chance where it is desired to have game outcomes with different probabilities. For example, the present invention could be used with games that simulate horse racing, card playing, bingo or keno.

DETAILED DESCRIPTION OF THE DRAWINGS

Figure 1:
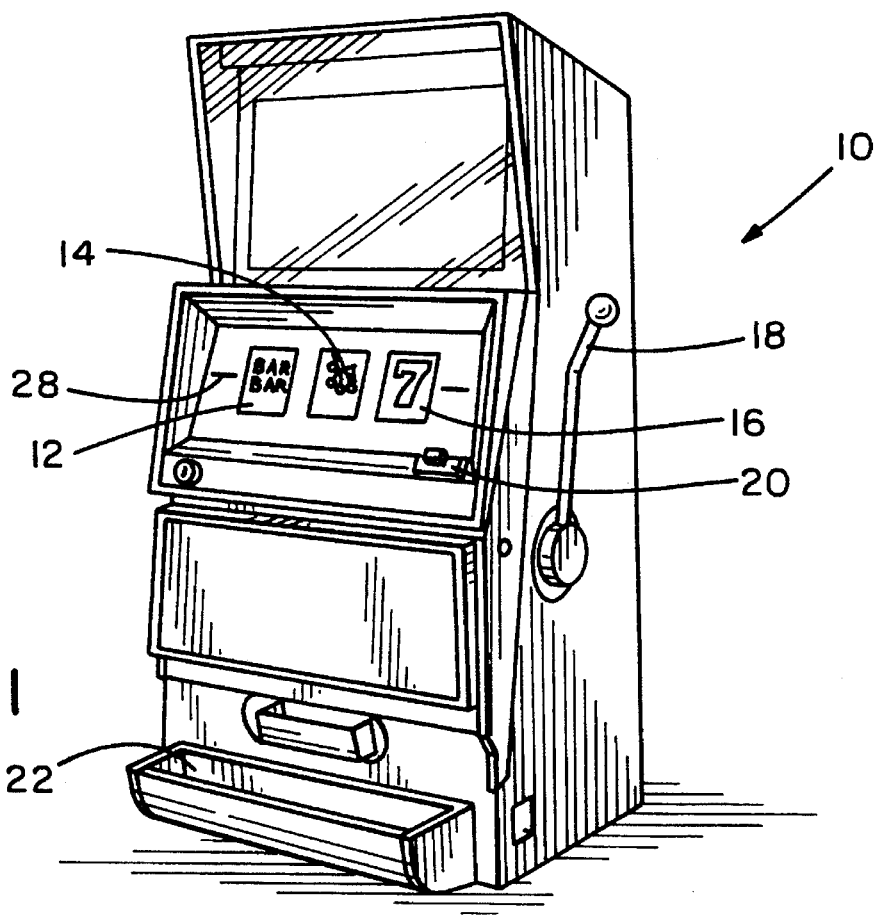
FIG. 1 is a perspective view of a standard electronic slot machine in which the present invention can be employed.

FIG. 1 is a perspective view of a standard electronic slot machine 10 in which the present invention can be employed. Except for the novel game control logic described below, slot machine 10 is a commercially available unit, such as manufactured by Bally Gaming, Inc. Slot machine 10 includes three symbol bearing reels 12, 14 and 16, which are rotatably mounted on a common axis. Slot machine 10 includes a lever 18, which a player pulls to initiate a game, and coin intake slot 20, through which the player inserts coins, and a coin hopper (not shown) which stores coins inside slot machine. A coin tray 22 is provided for dispensing a player's winnings.

Figure 2:
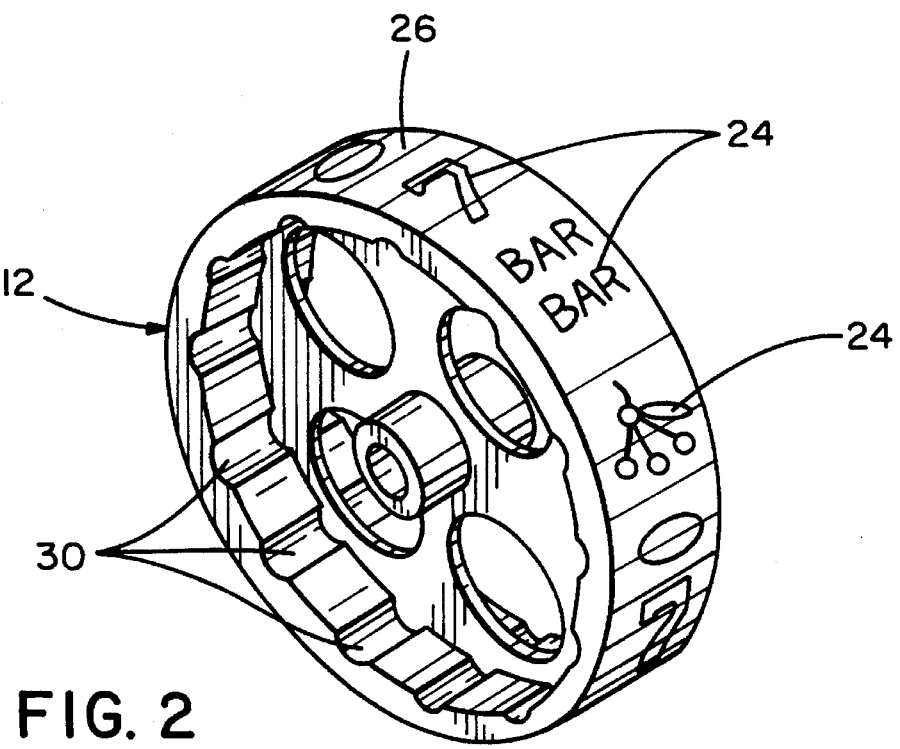
FIG. 2 is a perspective view of a reel from the slot machine of FIG. 1.

Reels 12–16 are substantially identical, although they may vary in terms of the number and placement of symbols, if desired. Representative of the other reels, reel 12 is shown in FIG. 2. Symbols 24 are located on the periphery 26 of reel 12. As shown in FIG. 1, a win 28 line is placed adjacent to the reels, so that when the reels are at rest, at least one symbol from each reel is visually associated with win line 28. Each reel's final resting position will be at a predetermined and discreet "reel stop position". At each reel stop position, a particular part of the reel's periphery (either a symbol or a blank space) is displayed at win line 28. Thus, each reel stop position is associated with a particular symbol or blank. For the purpose of illustration, these reel stop positions are represented as detents 30 in FIG. 2. Not every detent in FIG. 2 is indicated by a reference numeral.

Figure 3:
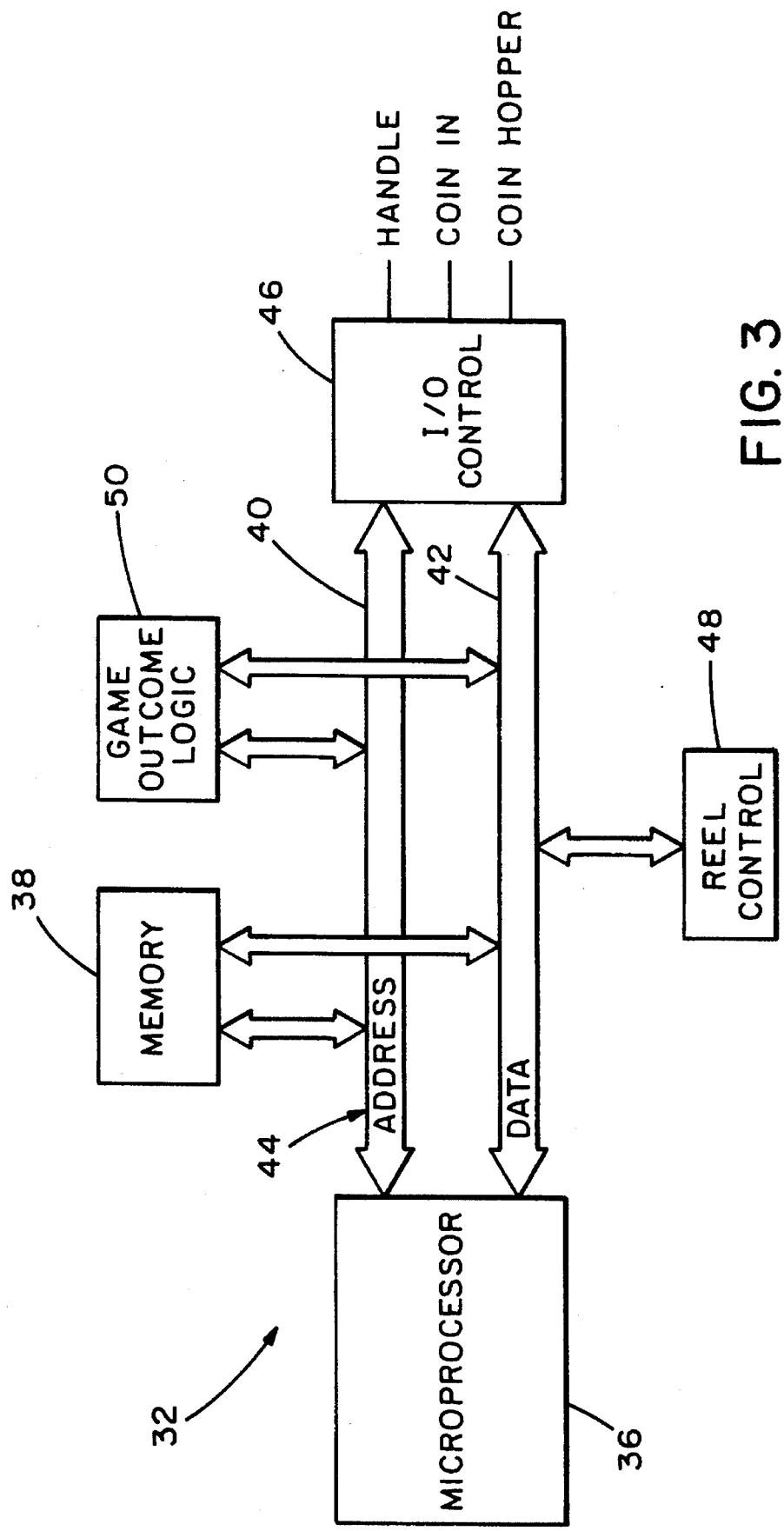
FIG. 3 is a block diagram of the electronic control system of the slot machine of FIG. 1 showing the game control logic in accordance with the invention.

FIG. 3 is a block diagram of an electronic system 32 for controlling slot machine 10, which includes game outcome logic in accordance with the invention. The system has a microprocessor 36, which is a Motorola 68000. Microprocessor 36 controls slot machine 10 in accordance with programs and data stored in a memory 38. Memory 38 is coupled to microprocessor 36 by address and data lines 40 and 42, respectively, of bus 44. Also coupled to microprocessor 36 via bus 44 are an input-output controller 46, a reel control mechanism 48 and a game outcome logic circuit 50, the operation of which is described below in detail.

Input-output controller 46 provides an interface between microprocessor 36 and various sensors (not shown). One sensor generates a HANDLE signal, indicating when the player has pulled handle. Another sensor generates a COIN IN signal indicating when the player has inserted coins into coin slot. Input-output controller 46 also allows microprocessor 36 to assert a control signal COIN HOPPER which actuates the coin hopper to discharge coins to tray 22.

Game play is initiated when microprocessor detects that a player has inserted a coin and pulled handle 18. Microprocessor 36 then queries a game outcome logic circuit 50, which provides randomly a selected reel stop positions for at least one of the three reels 12–16. The combination of selected reel stops is the game outcome. A table in memory 38 associates each possible game outcome with its corresponding payout (which in many cases may be zero).

Microprocessor 36 then writes the selected reel stops positions to reel control mechanism 48. Reel control mechanism 48 sets the reels into motion with a motor (not shown). The reels 12–16 are allowed to spin for a short time, and then are stopped at the selected reel stop positions. Symbols 24 on each of the reels 12–16 corresponding to the selected reel stops are displayed at win line 28, and microprocessor 36 dispenses the payout (possibly zero) associated with the selected game outcome.

Figure 4:
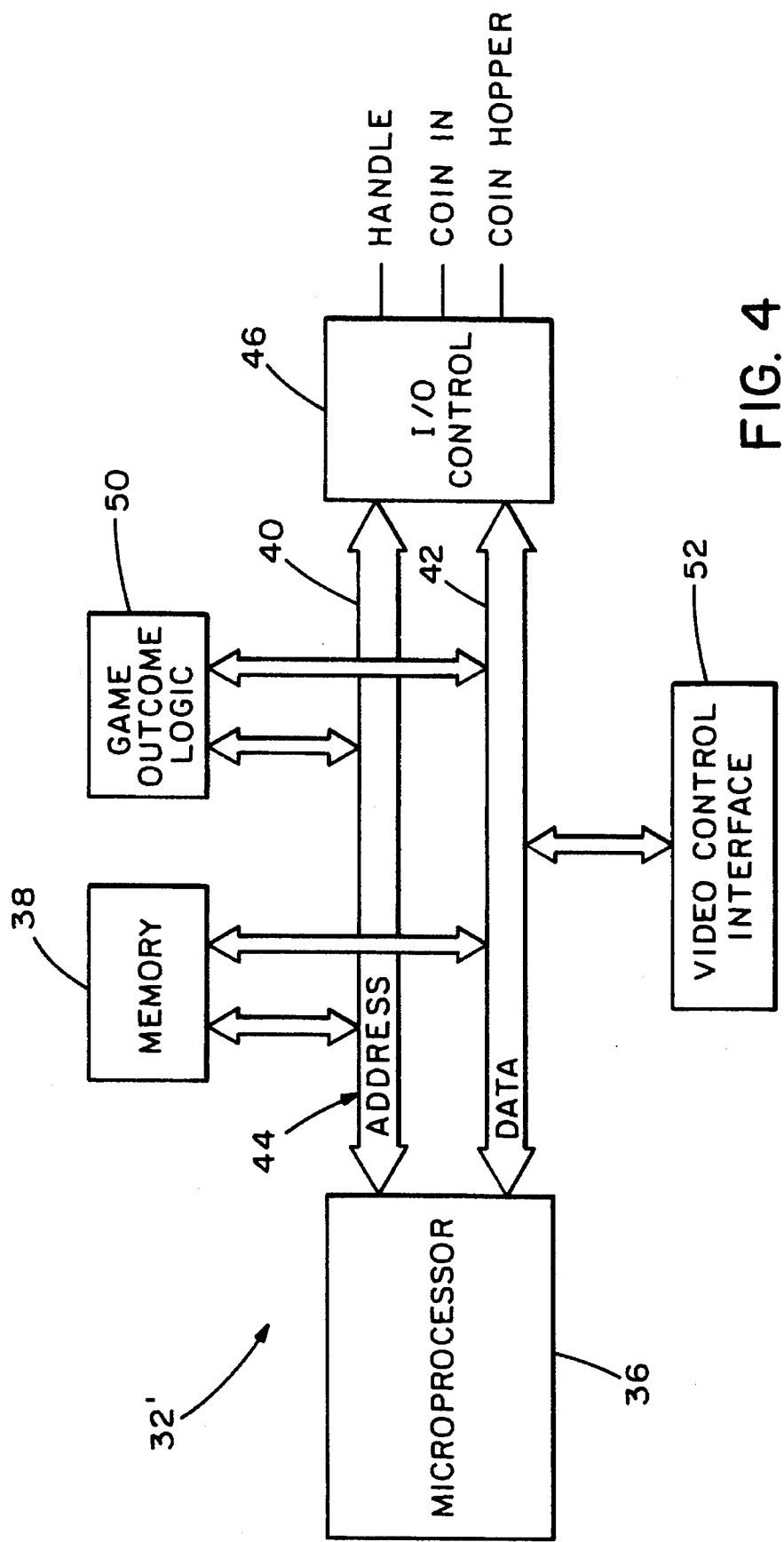
FIG. 4 is a block diagram of the electronic control system of FIG. 3 adapted for a video display slot machine.

It will be appreciated that the game result is determined by microprocessor 36 in cooperation with game outcome logic 50. The spinning reels 12–16 are used only to display that result. Thus, in lieu of physical reels 12–16, a video display can be used. FIG. 4 is a block diagram of an electronic control system 32' adapted for video displays. System 32' is comparable to system 32 of FIG. 3, except that in place of reel control mechanism 48, a video control interface 52 is provided. The interface allows microprocessor 36 to generate video display of the game result displayed on a video screen (not shown). The video display is a representation of spinning reels. However, any other suitable display (such as racing horses) could be used.

Each reel has a thirty-two reel stop positions, although this number may be varied. In accordance with the invention, the reel stops have a nonuniform probability distribution. That is, game outcome logic 50 is more likely to select some reel stops than it is to select others. Accordingly, slot machine 10 offers an expanded probability spectrum. Thus, some game outcomes (that is, combinations of reel stops) can be assigned very low odds and high payouts.

Figure 5:
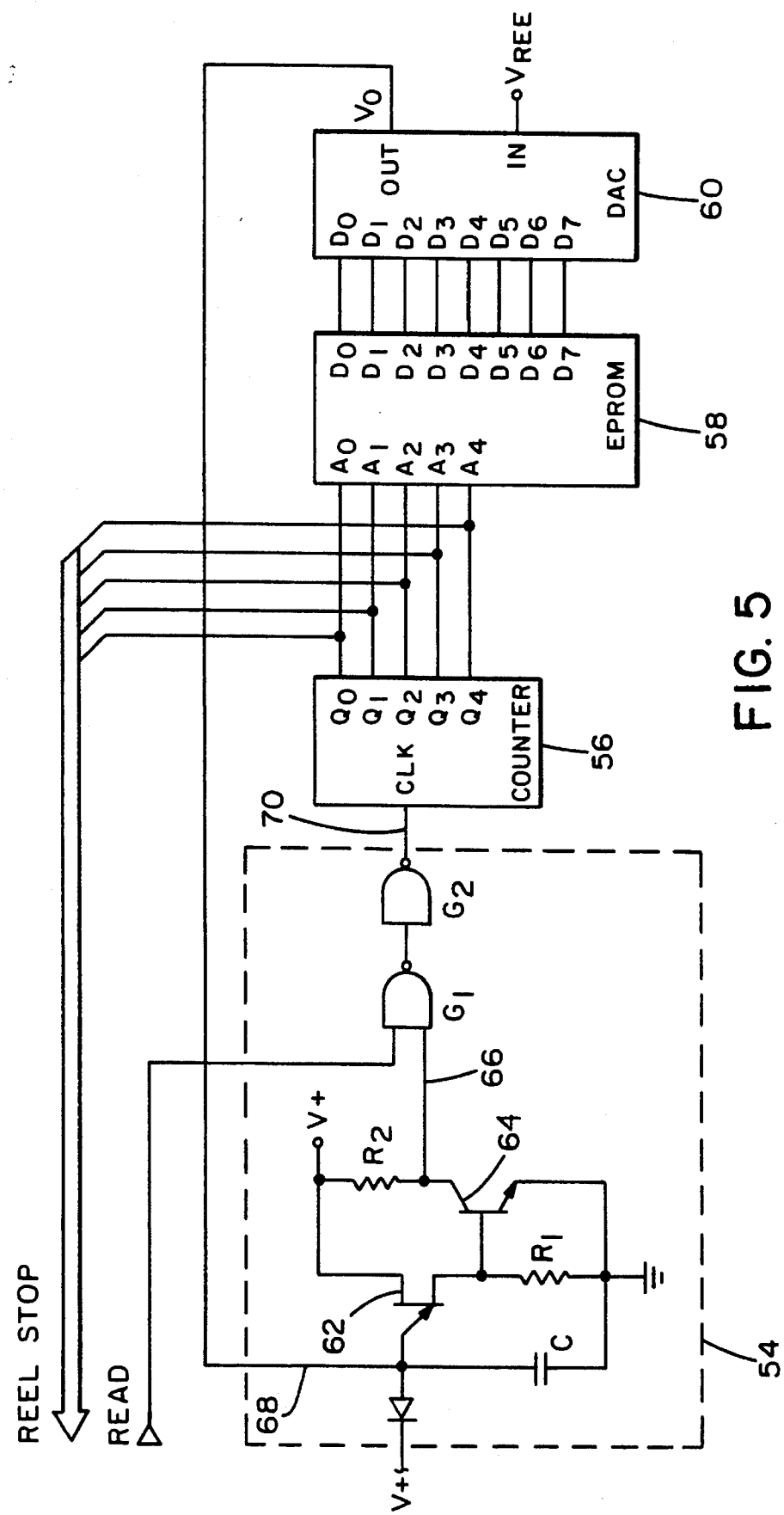
FIG. 5 is a block diagram of game outcome logic in accordance with a first embodiment of the invention.

FIG. 5 is a block diagram of game outcome logic circuit. When polled by microprocessor, circuit 50 generates a randomly selected five-bit REEL STOP signal, which corresponds to a selected reel stop position. Because the REEL STOP signal is five bits, there are thirty-two possible reel stop positions. As explained below, circuit 50 uses a time-based method to weight the probabilities of selecting each reel stop position, thus allowing a nonuniform probability distribution. This is accomplished in circuit 50 by means of an astable monovibrator 54, a five-bit counter 56, erasable programmable read-only memory ("EPROM") 58 and a digital-to-analog converter ("DAC") 60.

Generally, the counter 56 holds a number between zero and thirty-one, which represents one of the possible thirty-two reel stop positions. Monovibrator 54 generates a pulse train which rapidly and repetitively cycles counter 56 through its range. When a player initiates a game, monovibrator 54 is disabled, leaving counter 56 suspended on a particular number which is selected as the reel stop position.

The relative amount of time which counter 56 spends on a particular number determines the probability of that number being selected as the reel stop position. This time duration is varied in accordance with a series of binary numbers stored in EPROM 58. Each value of counter 56 causes a preselected one of the binary numbers to be the input of DAC 60. As input to DAC 60, each binary number causes DAC 60 to generate a particular analog signal, which controls the frequency of monovibrator 54, and thereby, the relative time counter 56 spends on a particular number.

These components are now explained in detail. Astable monovibrator 54 includes transistors 62 and 64; capacitor C, resistors $R_1$ and $R_2$ and supply voltage $V_+$. Monovibrator 54 generates a pulse train with a period which varies in accordance with the value of capacitor C and the current on line 68. Output 66 passes through two consecutive NAND gates $G_1$ and $G_2$, to provide timing signal 70, which pulses low at the same frequency as output 66. An external READ signal is also input to first NAND gate $G_1$, so that timing signal is disabled whenever the READ signal is asserted. Second NAND gate $G_2$ simply inverts the output of first NAND gate $G_1$.

Counter 56 has outputs $Q_0$ through $Q_4$ capable of representing a binary number between zero and thirty-one. Collectively, outputs $Q_0$ through $Q_4$ define the REEL STOP signal. Counter 56 also has a clock input CLK, which is coupled to timing signal 70 of astable monovibrator 54. When timing signal 70 pulses low, it strobes clock input CLK of counter 56, thus incrementing the value of the binary number on counter outputs $Q_0$ through $Q_4$. Thus, astable monovibrator causes counter 56 to rapidly cycle through its range of values many tens of thousands of times per second. These values are continuously available on the REEL STOP signal lines via outputs $Q_0$ through $Q_4$.

When user initiates game play, microprocessor 36 queries circuit 50 to obtain a randomly selected reel stop position. Microprocessor 36 first writes a control bit to circuit 50, which is addressably interfaced to bus 44 by suitable interface circuitry (not illustrated). The control bit is coupled to the READ signal, causing the READ signal to go from its normal high state to a low state. This disables timing signal 70, leaving the counter (and REEL STOP signal) suspended at a particular value. Microprocessor 36 reads this value as the randomly selected reel stop position. Finally, microprocessor 36 returns the READ signal to its normal high state, re-enabling timing signal 70, and causing counter 56 to resume its cycling.

For purposes of this description, game play is initiated by the player actuating the handle. However, game play could be machine actuated, so long as the device which actuates game play operates asynchronously from outcome logic circuit 50. In other words, the event which causes the READ line to be asserted must be time-independent of circuit 50, so that the counter's output is selected at an arbitrary point in time.

The frequency of timing signal 70 should be high enough that a player cannot readily predict the value of the counter 56 at the time the user initiates game play. Frequencies around 1 MHZ are quite adequate, although it may be possible to use considerably lower frequencies.

To obtain additional reel stop positions, microprocessor 36 repeats this query process. Alternatively, for more random results, additional game control logic circuits can be provided (one for each reel). These circuits can be run in parallel, and can be queried simultaneously to obtain a reel stop position for each of the reels.

As explained above, it is desirable to assign a nonuniform probability distribution to the reel stop positions. This is achieved by varying the period of monovibrator 54 in accordance with the invention so that some reel stop values remain in counter 56 longer than others. To this end, EPROM 58 and DAC 60 are provided. EPROM 58 includes address inputs $A_0$ through $A_4$ coupled to counter outputs $Q_0$ through $Q_4$, respectively, so that the value of counter at any given time addresses a particular memory location in EPROM. Alternatively, counter outputs $Q_o$ through $Q_4$ may be "coupled" to address inputs $A_o$ and $A_4$ in less direct ways. For example, the counter outputs could be multiplied and/or offset to obtain an address input. As the counter increments, the contents of EPROM are successively fed to DAC 60 via lines $D_0$ through $D_7$. DAC 60 generates an analog output (OUT), the current of which varies linearly with the value of the binary input.

Analog output OUT is fed back to monovibrator 54 via line 68. Because line 58 is coupled to capacitor C of monovibrator 54, the output current of DAC 60 controls the charge time of capacitor C, and thereby the frequency of oscillator 54. Thus, monovibrator 54 in cooperation with DAC 60 forms a clock whose output period is a function of a binary input, namely the contents of EPROM 58.

By controlling the period of monovibrator 54, one can control the amount of time counter 56 remains at a particular value, because counter 56 only increments with each cycle of monovibrator 54. Thus, by associating values in EPROM with particular counter outputs, one can program the relative amount of time which the counter 56 remains at each possible value, and consequently the likelihood that those values will be selected. Because the values of counter 56 represent reel stop positions, the foregoing system is a time-based method for assigning nonuniform probabilities to the reel stop positions.

To achieve a more precise linear relation between the binary values of EPROM 58 and the period of monovibrator 54, it would be desirable to control both the charging and discharging of capacitor C. Such precision would be desirable, for example, to comply with government regulations concerning the operation of gaming machines. However, for purposes of this illustration, DAC 60 is used only to charge capacitor C.

For example, assume that the binary address 00000 of EPROM 58 contains the binary number 10000, and the address 00001 contains the number 10100. As monovibrator runs, timing signal 70 strobes the CLK input of counter 56, causing it to increment. At some point, the value of counter 56 reaches 00000, which is asserted on counter outputs $Q_1$ through $Q_4$. This value is available both as the REEL STOP signal and as the address to EPROM 58 (via address inputs $A_0$ through $A_4$). If the user initiates a game play at this time, microprocessor will assert the READ signal, and will accept the value 00000 as the randomly selected reel stop position.

The value of counter 56 causes EPROM 58 to output the contents of location 0000 to DAC 60. In this case, address 00000 contains the binary number 10000. For the purpose of this example, we assume this value (10000) causes DAC 60 to output three milliamperes. As explained above, the current output of DAC 60 determines the period of monovibrator 54, and therefore the amount of time which counter 56 remains at 00000.

With three milliamperes of current on line 68, monovibrator 54 will eventually complete a cycle, causing to counter 56 to increment to 00001. At this value, counter 56 addresses a different location (that is, location 10001) of EPROM 56, which contains the binary number 10100. For the purpose of illustration, we assume that this value (1000) causes DAC 60 to output five milliamperes. This higher current results in faster charging of capacitor C, and consequently, a shorter oscillation period than occurred when DAC 60 output was only three milliamperes. Thus, counter 56 remains at value 00001 for less time than it remained at value 00000. Consequently, the time-based probability of selecting reel stop 00001 is lower than that of selecting reel stop 00000.

By programming EPROM 58 with the appropriate values, reel stop positions can be assigned desired nonuniform probability distributions. The additional memory space in EPROM can be used for self testing or other desired functions. Alternatively, in place of EPROM, EEROM or other non-volatile memory can be used. In that case, microprocessor can write desired values into the EEROM each time gaming machine is turned on. Microprocessor can obtain these values from its own memory 38 (which can be permanent memory such as EEROM), or from an external source, such as a central control computer. This allows greater flexibility in programming game outcome circuit 50, and avoids the expense of providing different EPROM chips for each model and style of gaming machine 10.

Although the invention has been illustrated with respect to particular embodiments, other embodiments are possible within the scope of the claimed invention as recited by the attached claims.

What is claimed is:

1. A gaming machine, comprising:

a clock having a binary input and generating a periodic timing signal, wherein the frequency of the timing signal depends on the value of the binary input;

a counter having an input coupled to the periodic timing signal, and an output which increments in accordance with the frequency of the timing signal;

addressable memory capable of generating as output one of a plurality of preprogrammed binary values in response to particular values of counter outputs, wherein the memory's output is coupled to the clock's binary input;

asynchronous means for periodically selecting the counter's output as a game result, said asynchronous means being time independent of said clock; and display means for displaying the game result represented by the selected counter output.

2. A gaming device, comprising:

a periodic signal generator having an analog input and a periodic output signal, the frequency of which varies in accordance with the analog input signal;

a counter responsive to the periodic output signal, the counter incrementing its output in accordance with the frequency of the periodic output signal;

means for periodically selecting the counter's output at an arbitrary point in time as a game result, wherein the frequency of the periodic output signal is sufficiently high that a player cannot readily predict the value of the selected counter output;

display means for displaying the game result represented by the periodically selected counter output;

addressable memory having a plurality of addressable locations, each containing a preprogrammed binary value, and having an address input coupled to the counter's output; and means for generating an analog signal in accordance with a binary value contained in the memory at the location having an address corresponding to the counter's output, wherein the analog signal is coupled to the analog input of the periodic signal generator.

3. A gaming device, comprising:

an oscillator which includes an analog input, an output and a capacitor, wherein the output is a timing signal, the frequency of which varies in accordance with values of the analog input and the capacitor;

a counter responsive to the timing signal, the counter incrementing its output in accordance with the frequency of the timing signal;

player-actuated means for periodically selecting the counter's output at an arbitrary time as a game outcome, wherein the player-actuated means is asynchronous with the oscillator so that a player cannot readily predict the value of the selected counter output at the arbitrary time;

binary memory means for associating possible values of the counter output with preselected values, and for generating as digital output the preselected value associated with the value of the counter output;

a digital-to-analog converter having a digital input coupled to the digital output of the memory, and an analog output coupled to the input of the oscillator; and means for displaying the game outcome represented by the periodically selected counter output.

* * * * *

UNITED STATES PATENT AND TRADEMARK OFFICE
CERTIFICATE OF CORRECTION

PATENT NO. : 5,524,888
DATED : June 11, 1996
INVENTOR(S) : Raymond Heidel

It is certified that error appears in the above-indentified patent and that said Letters Patent is hereby corrected as shown below:

Column 7, line 12, delete "monovibrator" and insert -- multivibrator --

Column 7, line 13, delete "58" and insert -- 68 --

Column 7, line 16, delete "monovibrator" and insert -- multivibrator --

Column 7, line 19, delete "monovibrator" and insert -- multivibrator --

Column 7, line 22, delete "monovibrator" and insert -- multivibrator --

Column 7, line 31, delete "monovibrator" and insert -- multivibrator --

UNITED STATES PATENT AND TRADEMARK OFFICE
CERTIFICATE OF CORRECTION

PATENT NO. : 5,524,888
DATED : June 11, 1996
INVENTOR(S) : Raymond Heidel

It is certified that error appears in the above-indentified patent and that said Letters Patent is hereby corrected as shown below:

Column 7, line 40, delete "monovibrator" and insert -- multivibrator --

Column 7, line 41, before "runs," insert -- 54 --

Column 7, line 43, delete "$Q_1$" and insert -- $Q_0$ --

Signed and Sealed this

Twenty-sixth Day of November 1996

Attest:

BRUCE LEHMAN

*Attesting Officer*   *Commissioner of Patents and Trademarks*